(12) United States Patent
Dominique et al.

(10) Patent No.: US 7,499,433 B2
(45) Date of Patent: Mar. 3, 2009

(54) METHOD AND APPARATUS FOR DTX FRAME DETECTION

(75) Inventors: Francis Dominique, Rockaway, NJ (US); Martin Howard Meyers, Montclair, NJ (US); Leonard Piazzi, Denville, NJ (US); Alexandro Salvarani, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1040 days.

(21) Appl. No.: 10/298,551

(22) Filed: Nov. 19, 2002

(65) Prior Publication Data

US 2004/0095918 A1    May 20, 2004

(51) Int. Cl.
*H04B 7/216* (2006.01)
(52) U.S. Cl. .................. 370/335; 370/342; 370/329; 455/450
(58) Field of Classification Search .................. 370/252, 370/329, 332, 333, 335, 342, 441; 455/522, 455/450; 375/340, 147, 316, 148, 224, 227
See application file for complete search history.

(56) References Cited

U.S. PATENT DOCUMENTS

| 6,782,059 B2 * | 8/2004 | Lin .......................... 375/340 |
| 7,143,178 B2 * | 11/2006 | Glazko et al. ............... 709/231 |

* cited by examiner

*Primary Examiner*—Danh C Le

(57) ABSTRACT

A method and apparatus for detecting discontinued transmission (DTX) frames in data frames received over a link or channel, is described, where a DTX frame is a frame that does not carry data and which is transmitted with zero power over the link or channel. The method and apparatus determines whether a received data frame is a DTX frame based on a plurality of metrics. Based on the metrics, the method and apparatus may effectively discriminate a case where a data frame is received as an erasure (e.g., data frame received with errors), and a case where a transmitted data frame is received as a DTX frame.

9 Claims, 2 Drawing Sheets

METHOD AND APPARATUS FOR DTX FRAME DETECTION

BACKGROUND OF THE INVENTION

1. Field of the Invention

The present invention is generally related to communication systems, and more particularly, to an apparatus and method for detecting DTX frames in communication systems.

2. Related Art

Cellular telecommunication systems are typically characterized by a plurality of transceivers in mobile phones and base stations. Each transceiver includes a transmitter and a receiver which communicate with each other via one or more links. A link typically comprises a plurality of communication channels such as signaling channels and traffic channels. Traffic channels are communication channels through which users convey (i.e., transmit and/or receive) user information. Signaling channels are used by the system equipment to convey signaling information used to manage, operate and otherwise control the system. The system equipment, which are typically owned, maintained and operated by a service provider, include various known radio and processing equipment used in communication systems. The system equipment along with user equipment (e.g., cell phone) generate and receive the signaling information.

Communication signals transmitted and received via communication links are often distorted by various anomalies that exist in the communication channels. These channel anomalies cause the signals to be received erroneously. For example, channel anomalies such as Rayleigh fading, frequency translation and phase jitter often cause the signals to lose power, so that a signal is received at a significantly lower power level than it was transmitted. As a result, signals adversely affected by channel anomalies are often received with errors. One way of preventing errors from occurring, or at least to reduce the likelihood of errors occurring, is by applying power control techniques to these communication systems.

Typically, a power control algorithm is performed at a base station. In looking at a signal received from a mobile, if the signal looks weak (e.g., based on detected frame error rate (FER)), the base station sends a command to either increase or decrease mobile station transmit power. For example, a comfortable level of quality in a voice system is possible with a FER of approximately 1%. If FER is much less than (<<) 1%, the mobile station is wasting power, and the power control algorithm located at the base station sends commands to the mobile requesting the mobile to reduce the transmit power. For FER much greater than(>>)1%, the level of quality is degraded and the base station sends a command to the mobile to bring the mobile transmit power up in order to restore quality.

Typically, in order to effect power control at the base station, two loops are utilized, termed "closed-loop power control": inner loop power control and outer loop power control. In an exemplary CDMA communication system for example, an inner loop power control algorithm ("inner loop"), which may operate at a speed of 800 Hz for example, is used to adjust the power at the transmitter. Thus, a base station measures a received signal to noise ratio (known as $E_b/N_t$) and compares the $E_b/N_t$ value to a threshold. The threshold is used by the inner loop to determine a specified quality of service for power control. If the received $E_b/N_t$ is too high (e.g., above the threshold), the base station transmitter sends a down power command to the mobile station, and vice versa where $E_b/N_t$ is too low.

However, a communication path between base station and mobile station is not often line of sight (LOS), and is constantly changing due to the motion of the mobile station, or due to the mobile station's surroundings. As a consequence, path loss between the base station and the mobile station is constantly changing. Under these conditions, the threshold must be adjusted in order to maintain the quality of service of the radio link. The system that performs the function of adjusting the threshold (e.g., setting and adjusting the set point of the threshold) is called the outer loop power control ("outer loop"). Together with the inner loop, the outer loop forms the closed loop power control.

As noted above, the threshold is used to ensure quality of service of the radio link and typically depends on the speed of the mobile and the RF environment in the surroundings of the mobile. The speed in which the outer loop updates (adjusts) the threshold is lower than the inner loop speed. Typical the outer loop operates at a speed of 50 Hz, which is lower than the speed of the inner loop. Thus if the mobile is moving at a low speed, in relation to the base station, the outer loop is effective in adjusting the threshold. However, at high speeds (e.g., in a fading condition environment such as an environment subject to Rayleigh fading) the outer loop is not effective in tracking the changes of the RF conditions. Typically the outer loop is tuned to operate at low FER for efficiency. Thus, a small fraction of all data frames (frames) received by the base station constitute frames that are received with errors. These frames received with errors are called "erasures". The instance of receiving an erasure triggers the outer loop to increase the threshold (e.g., raise the set point of the threshold). When a frame is received without error (e.g., normally received), the outer loop lowers the threshold slightly in order to decrease its transmitted power and interference to other mobiles.

However, due to a mechanism that is fundamentally different from closed loop power control, the base station can receive frames in error, if the mobile decides not to transmit frames at a given time. For example, if the mobile does not have data to send to the base station, but the mobile wants to maintain the connection (e.g., maintain the data channel up) to the base station, the mobile is allowed to maintain the data channel up and set the power of a given transmitted frame to zero. This can happen at any time during the data transmission. This condition, where the mobile station actually transmits a frame, but the frame contains no data and has its power (e.g., gain) set to be zero, is called a Discontinued Transmission (DTX) mode. DTX mode can be initiated by the mobile at any time, without informing the base station (e.g., the base station has no knowledge that the mobile station has shifted to DTX mode). Accordingly, frames that do not carry data and which are transmitted with zero power are called "DTX frames". The mobile station transmits DTX frames to the base station to avoid bringing down the connection (data channel) when the data traffic is bursty. For example, data in cellular communications is typically transmitted in bursts (e.g., many consecutive frames of data transmitted, followed by silence, followed by another "burst" of data, etc.).

To the base station, both DTX frames and erasures exhibit similar signal strength around the noise level. Thus, it is difficult for a base station receiver to distinguish between DTX frames and erasures. The base station must perform some type of efficient blind detection in order to efficiently distinguish DTX frames from erasures.

Received frames that are incorrectly identified as DTX frames by a receiver prevent the outer loop from increasing the threshold, which potentially may cause additional erasures. Further, received frames that are incorrectly identified as erasures cause the outer loop to unnecessarily increase the set point of the threshold increasing interference and ultimately decreasing the call capacity of the system.

The ideal response of the closed-loop power control algorithm when processing DTX frames is fundamentally different from a response to processing erasures. For example, if a DTX frame is received, the power control outer loop should freeze the threshold (e.g., maintain the threshold at a given set point) for the duration of the DTX. However, if a frame undergoes a channel fade and an erasure is actually received, the outer loop should increase the threshold in order to maintain quality of service of the link. Since the response of the outer loop depends on the detected state of the received frames, DTX detection by the receiver must be reliable.

DTX frames are detected at the receiver end. In the forward link, DTX detection is done at the mobile station, while in the reverse link, DTX detection is performed at the base station. Typically, DTX detection is accomplished using a technique that compares a metric, such as a measured traffic energy value of the channel or symbol error rate (SER) value of the transmitting channel, against the threshold. If the metric is lower than the threshold, then the frame is declared DTX; otherwise the frame is an erasure. However, the reliability of this technique is susceptible to noise fluctuations that cause detection errors. Further, this susceptibility increases as the transmitted signal becomes weakened.

Accordingly, power control algorithms using existing DTX detectors (e.g., a DTX detector using a single channel energy metric or a single SER metric) must tune operation based on a compromise between two opposing requirements: (1) a requirement to minimize the probability that a DTX frame is detected as an erasure ("P(E|D)"), in order to increase the link capacity; and (2) a requirement to minimize the probability that frames transmitted and received in error (e.g., erasures) are detected as DTX frames, in order to avoid a burst of errors in the link. This second probability is referred to as P(D|E).

Typically, this compromise is arranged so as to maximize link capacity, i.e., the DTX detector is operated such that P(E|D) is small (less than 10% of the target frame error rate (FER) of the link). When a DTX detector is tuned in this way, P(D|E) increases to unacceptable levels. This is particularly undesirable for traffic channels where the coding is efficient (e.g. turbo-coding), and to traffic channels where the average traffic energy of transmitted frames such as erasures are close to the traffic energy of frames that are not transmitted (e.g., DTX frames). In order to overcome this deficiency, to avoid a burst of frame errors, and to avoid degradation of the quality of service of the traffic channel, the conventional power control algorithm used by existing DTX detectors must increase the transmitted power when DTX frames are detected. The power increase thus unnecessarily decreases link capacity. Thus, the existing DTX detector is not effective in maintaining the probability of false DTX frame detection low.

SUMMARY OF THE INVENTION

A method and apparatus for detecting discontinued transmission (DTX) frames in data frames received over a link or channel is described, where a DTX frame is a frame that does not carry data and which is transmitted with zero power over the link or channel. The method and apparatus determines whether a received data frame is a DTX frame based on a plurality of metrics. By comprising the metrics against thresholds, the method and apparatus may effectively discriminate a case where a data frame is received as an erasure (e.g., data frame received with errors), and a case where a transmitted data frame is received as a DTX frame.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Figure 1:
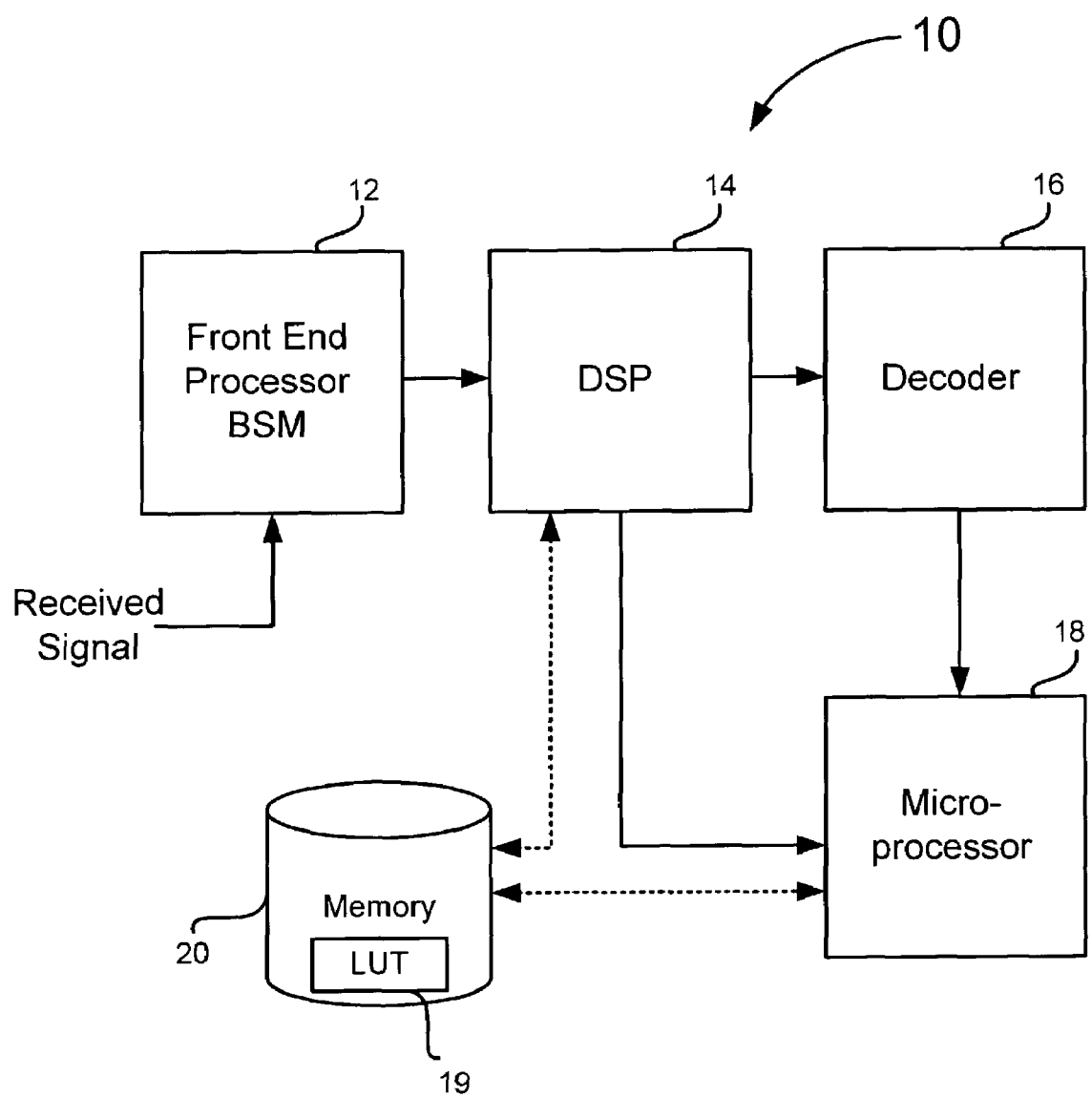
FIG. 1 is a simplified block diagram of a receiver incorporating a DTX detection capability in accordance with an exemplary embodiment of the present invention.

Although the principles of the invention are particularly well-suited for wireless communications systems based on the well-known IS 2000 or CDMA 2000 standards, and will be described in this exemplary context, it should be noted that the embodiments shown and described herein are meant to be illustrative only and not limiting in any way. For example, the present invention is also applicable to the well-known High Speed Downlink Packet Access (HSDPA) specification in the Universal Mobile Telecommunication System (UMTS) standard. As such, various modifications will be apparent to those skilled in the art for application to other transmission systems and are contemplated by the teachings herein.

The method and apparatus in accordance with the invention improves DTX detection reliability for existing DTX detectors that utilize a single metric. The improvement in DTX detection reliability is achieved by adding additional metrics to the channel energy metric or channel SER metric, so that a condition required to declare a received data frame as a DTX frame is more restrictive. The newly added metric is chosen so that it may be used to effectively discriminate between the following two cases: (a) a case where the data frame is actually transmitted (such as an erasure, which is a frame that is transmitted with errors), but the DTX detector declares the frame a DTX frame; and (b) a case where a frame is not transmitted, (e.g. a DTX frame) but the DTX detector declares the frame as an erasure. The newly defined metric does not cause the value of P(E|D) to increase above acceptable levels (e.g., P(E|D) remains essentially unchanged.

In an embodiment, a first metric of two metrics is compared with a first threshold in an effort to detect a DTX frame with greater discrimination and effectiveness. Further, and based on a result of the comparison of the first metric with the first threshold, the second of the two metrics is compared against a second threshold. The comparison of multiple metrics against multiple thresholds enables a DTX detector to effectively discriminate cases (a) and (b) above. The added metric does not adversely affect the value of P(E|D), e.g., P(E|D) remains essentially unchanged or at least below a level that is acceptable based on the particular application being used to transmit data.

When cases (a) and (b) are reliably discriminated, a DTX detector based on the traffic energy metric alone (e.g., single metric detection) may be tuned for low values of P(E|D). Moreover, the newly added metric maintains the value of P(D|E) low. In this way, an optimal compromise between a low P(E|D) and a low (P(D|E) may be achieved. Accordingly, call capacity and data throughput of the link may be improved, relative to a case where an existing DTX detector based on only the single metric (traffic energy or SER) is used. In other words, a power control algorithm employed by an apparatus in accordance with the invention does not need to increase the transmitted power when DTX frames are detected.

FIG. 1 is a simplified block diagram of a receiver incorporating a DTX detector in accordance with the present invention. In this embodiment, the method and apparatus is described from the aspect of the reverse link, i.e., DTX frame detection is performed at a base station receiver. However, the method and apparatus described herein are applicable to the forward link (e.g., DTX frame detection at a mobile station receiver). Accordingly, in FIG. 1, receiver 10 may be a receiver in a base station of a cellular communication system, for example. The receiver 10 includes a base station modem (BSM) chip level processing stage 12, which may include finger front end pseudo-noise (PN) processing. After the PN code is removed from each finger (e.g., each signal component) of a signal that is transmitted over a channel or link. The received signal contains one or more frames, where "frame" refers to a data frame that is carrying data over the channel between a transmitter and receiver.

The implementation shown in FIG. 1 may include storage media operatively connected to, or embodied within each of the processors 12, 14 and 18. The memory 20 may be embodied as ROM, RAM, SDRAM or other non-volatile memory device, and may store parameters that are part of a register or LUT 19 which is accessible by one or more of the processors. Further, multiple memories may be dispensed with altogether or consolidated within a singular memory device.

The received signal is processed by a symbol level processor 14. In an embodiment, this could may be implemented as a digital signal processor (DSP) or alternately as an ASIC. The DSP 14 converts the symbols into data bits. The data bits are then output to a decoder 16, which in an illustrative code division multiple access (CDMA) system, performs speech (e.g., Viterbi) or data decoding.

The DSP 14 also calculates a metric used for initially identifying DTX frames. A metric may be embodied as a measured traffic energy of the channel value or a symbol error rate (SER) value of the transmitting channel, for example, it being understood that the metric could be any other measurable or calculated parameter of the transmitting channel. The traffic energy metric may be embodied as a measured average power value that is received over a particular channel. This metric may be dynamic, as it may change on a frame-by-frame basis. The higher this value, the better the signal. For example, a measurement for an SER metric may be performed by collecting encoded symbols (a symbol is a block of information; 2 symbols=1 bit) output from an encoder within the front end processor 12 for each frame, decoding the symbols in decoder 16 to remove errors, and then resubmitting the decoded symbols to the encoder so as to compare the output of the encoder to the original input of encoded symbols into decoder 16 to determine an error rate. A traffic energy metric or SER metric may be calculated for every frame received over a channel. The metric may be output to a microprocessor 18 for final processing.

Additionally DSP 14 may store a predetermined DTX threshold that may be used for comparison to the metric. The DTX threshold ("first threshold") may be compared against a metric at DSP 14 to determine whether or not a data frame corresponding to that metric is a DTX frame, or a frame that was transmitted with error (e.g., an erasure). Alternatively, DSP 14 may contain a particular algorithm or separate ASIC which performs a DTX threshold calculation based on data rate received. The algorithm may provide the flexibility to read the value of the DTX threshold from an external register (e.g., LUT 19) that is set in a call-by-call basis by a software application/ASIC running the algorithm, depending on the data rate. Further, the DTX threshold may be estimated through link level simulation results or through field measurements.

DSP 14 may be constructed with an ASIC (application specific integrated circuit) that contains, for example, a general purpose R3000A MIPS RISC core, with sufficient on-chip instruction cache and data cache memory. Furthermore, DSP 14 may integrate system peripherals such as interrupt, timer, and memory controllers on-chip, including ROM, SDRAM, DMA controllers; a packet processor, crypto-logic, PCI compliant PC port, and parallel inputs and outputs, for example.

Microprocessor 18, which may also be embodied as part of an ASIC, or as a singular microprocessor chip, may set or establish another DTX threshold ("second threshold). This second DTX threshold may be set to a predetermined fixed value. Alternatively, microprocessor 18 may set a DTX threshold based on the best data rate received from DSP 14 for a particular traffic channel, as described above. The second DTX threshold is conditionally used, e.g., certain conditions should be met based on the comparison at DSP 14, in order for the second DTX threshold to be evaluated at microprocessor 18.

In an aspect of the invention, an additional metric may be determined at microprocessor 18 so that its value is correlated with the RF traffic channel condition of a received frame, or of the traffic channel used to transmit the data frames to the receiver. However, and as will be explained in further detail below, the additional metric does not depend on whether or not the data frame has been transmitted. Thus, when the RF traffic channel conditions are degraded (e.g., due to fast Rayleigh fading, for example), the distribution of values of the new metric are fundamentally different then the distribution of values when the RF traffic channel conditions are improved.

The additional metric may be selected from one or more measured parameters or values, such as a pilot frame energy of the received data frame, and/or from channel estimates and SER of an alternative traffic channel that is known, a priori, not to be in DTX. Alternatively, a combination of these metrics may be used in combination with the existing metric measured at DSP 14, so as to improve DTX detector performance.

Figure 2:
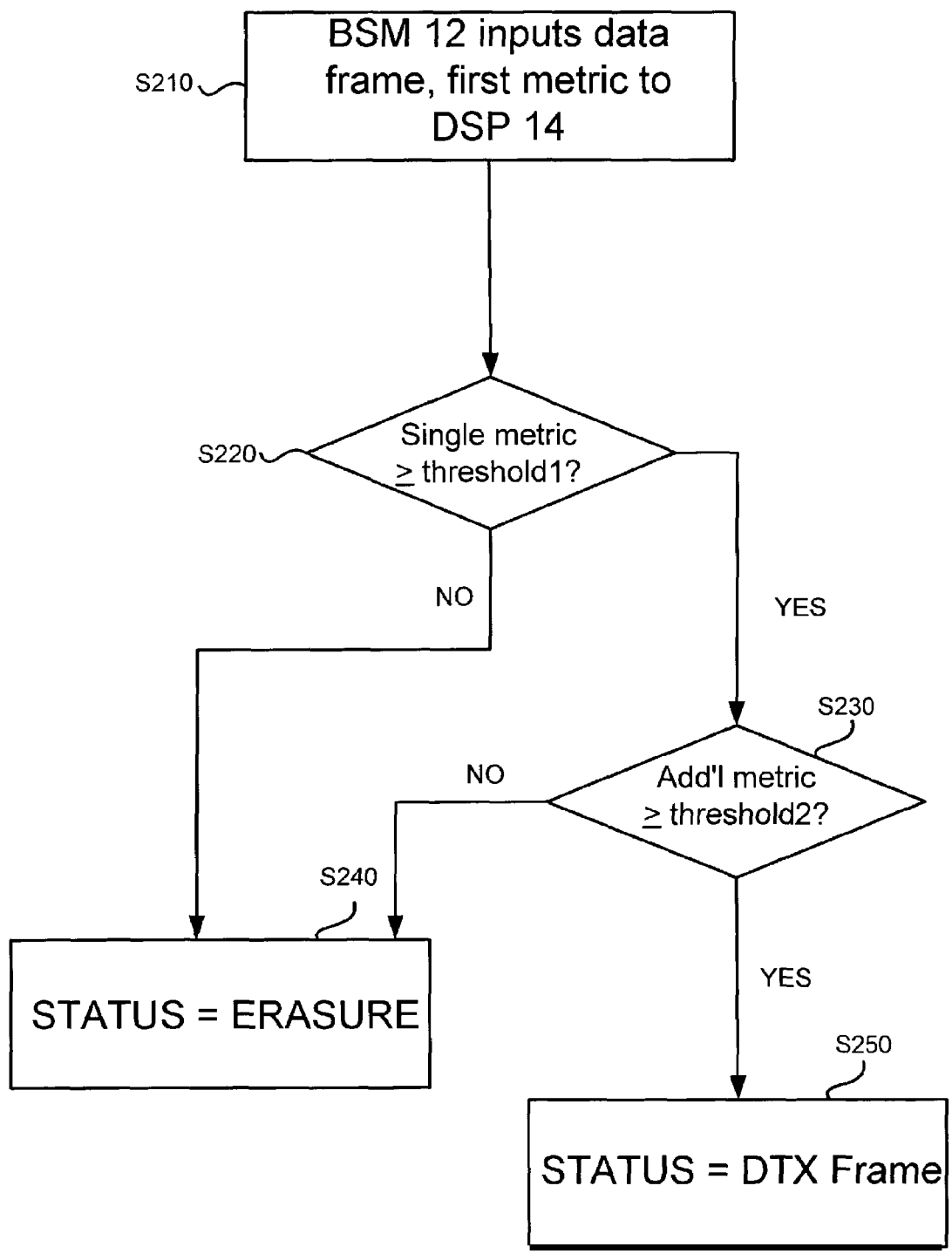
FIG. 2 is a flow diagram illustrating the method in accordance with an exemplary embodiment of the invention.

FIG. 2 is a flow chart illustrating a method in accordance with an exemplary embodiment of the invention. Referring now to FIG. 2, each finger (component) of the received signal together with a corresponding calculated or measured metric (e.g., traffic energy metric or symbol error rate (SER) metric for that channel) are sent from BSM chip level processing stage 12 to DSP 14 (Step S210). Depending on the result of a first comparison between a metric and a first threshold at DSP 14, a second comparison may be performed between an additional metric and a second threshold at microprocessor 18.

DSP 14 compares (Step S220) the measured metric (e.g., traffic energy metric or SER metric) for each frame received from a transmitting channel against a first threshold (thresh1) and sends a result to microprocessor 18. If the metric value is less than (<) thresh1, (e.g., the output of Step S220 is NO), DSP 14 determines that an erasure (transmitted frame received with errors) has been transmitted and outputs DTX status to microprocessor 18 (Step S240).

However, if the metric is equal to or exceeds ($\geq$) thresh1 (the output of Step S220 is YES), then a second threshold comparison (Step S230) is conducted between a thresh2 and an additional metric at microprocessor 18. If microprocessor 18 determines that the additional metric is less than thresh2 (e.g., NO at Step S230), microprocessor 18 outputs a bad frame (erasure) as DTX status (Step S240). If the additional metric is equal to or exceeds($\geqq$) thresh2 (YES at Step S230), then the frame is declared to be a DTX frame (Step S250). Accordingly, discrimination as to whether a transmitted frame is a DTX frame, or simply an erasure (bad frame transmitted with error), is determined with greater accuracy, since an additional metric is used The following is a probability comparison which illustrates advantages of the method and apparatus in greater detail. In this example, the probabilities of DTX detection of a conventional single metric DTX detector are compared with the probabilities of DTX detection obtained with the system and method of the present invention. It is assumed that when using a single metric, the detection probabilities are as follows:

(a) P(E|T)=probability that a frame transmitted and received with errors (e.g., an erasure) is detected as an erasure;

(b) P(D|T)=probability that an erasure is detected as DTX frame (c) P(E|NT)=probability that a DTX frame is detected as an erasure (d) P(D|NT)=probability that a frame not transmitted (e.g., a DTX frame) is detected as a DTX frame where T and NT label the transmitted state and E and D label the receiver state.

Additionally, $N_{EF}$ represents the number of detected frames of errors, and $N_{DTX}$ represents the number of detected DTX frames respectively for the DTX detector using the single traffic energy metric. Accordingly, the following expression (1) is obtained:

$$\begin{pmatrix} N_{EF} \\ N_{DTX} \end{pmatrix} = \begin{pmatrix} P(E|T) & P(E|NT) \\ P(D|T) & P(D|NT) \end{pmatrix} \begin{pmatrix} N_T \\ N_{NT} \end{pmatrix}$$

where $N_T$ and $N_{NT}$ represent the number of transmitted frames received with errors and the number of frames not transmitted, respectively. Also P(E|T)+P(D|T)=1 and P(E|NT)+P(D|NT)=1, since the probabilities are mutually exclusive and no frame is lost (e.g., EF+DTX=T+NT).

An ideal DTX detector is defined as P(E|T)=P(D|NT)=1 and P(E|NT)=P(D|T)=0. In a realistic DTX detector, the non-diagonal elements P(E|NT) and P(D|T) are not zero, and their values are such that when P(E|NT) increases, P(D|T) decreases and vice versa (this is a consequence of using a threshold to decide if a received frame is a DTX frame or not).

Assume a new metric, such as the additional metric in accordance with the method and apparatus of the invention, is introduced. Assume that a condition M derived from the new metric is added to the definition of DTX frames, such that a frame is declared as a DTX frame by the receiver if the DTX detector using the single metric declares the frame as a DTX frame and if the metric M declares the frame as a DTX frame. Otherwise, the frame is declared as transmitted and received with errors. Assume the new variables with the "'" label are used to define the new states and number of frames detected using the new metric. Then $$\begin{pmatrix} N'_{EF} \\ N'_{DTX} \end{pmatrix} = \begin{pmatrix} P(E'|T) & P(E'|NT) \\ P(D'|T) & P(D'|NT) \end{pmatrix} \begin{pmatrix} N_T \\ N_{NT} \end{pmatrix}$$

where the new probabilities are given by:

$P(E'|T)=P(E|T)+P(\overline{M},D|T)$ $P(E'|NT)=P(E|NT)+P(\overline{M},D|NT)$ $P(D'|T)=P(M,D|T)$ $P(D'|NT)=P(M,D|NT)$ (2)

and where M is the receiver state satisfied when the new metric satisfies a given condition (e.g., a threshold condition) and $\overline{M}$ is the receiver state opposite to M. Additionally, P(M, D|T)=is the join probability that states M and D are detected at the receiver given state T; P($\overline{M}$,D|T)=represents the join probability that states $\overline{M}$ and D are detected at the receiver given state T; P(M,D|NT=represents the join probability that states M and D are detected at the receiver given state NT; and P($\overline{M}$,D|NT) is the join probability that states $\overline{M}$ and D are detected at the receiver given state NT.

Since states M and $\overline{M}$ are mutually exclusive then the following expression (3) is satisfied:

$P(\overline{M},D|T)+P(M,D|T)=P(D|T)$; and $P(\overline{M},D|NT)+P(M,D|NT)=P(D|NT)$ (3)

The single metric DTX detector is tuned so that P(E|NT)≈0 to optimize link capacity, and therefore P(D|NT)≈1. Metric M is chosen so that P(M,D|NT)≈P(D|NT)≈1 and P(M,D|T) ≈0. This is possible because the value of metric M depends on traffic channel RF conditions, but does not depend on the transmitted state (e.g., NT). In other words, metric M tracks the RF channel conditions, so when the RF channel is good and the DTX detector declares the received data frame as a DTX frame, then the data frame is most likely a DTX frame, because it is unlikely that the data frame was received in error (e.g., as an erasure) under good RF conditions. This means that when the receiver state is D, metric M is able to effectively distinguish the transmitted state T from state NT. Conversely, when metric M indicates that the RF channel conditions are degraded, then if the DTX detector declares the received frame as a DTX frame, the frame is most likely to have been transmitted and received in error (e.g., an erasure), since most frames received in error are due to bad RF conditions. Further, the probability of not transmitting a frame during the time when traffic errors occur is small, because the traffic frame error rate (FER) is low. Given these choices, when a traffic error occurs the following relations are satisfied:

$1 \geqq P(E'|T) > P(E|T) \approx 1$; (4a)

$P(E'|NT) \approx P(E|NT) \approx 0$; (4b)

$P(D'|T) \approx 0$; and (4c)

$P(D'|NT) \approx P(D|NT) \approx 1$ (4d)

Accordingly, the above relations (4a-4d) indicate that a DTX detector designed in accordance with the method and apparatus of the invention is more reliable than the single metric DTX detector. Relation (4a) indicates that, by using the additional metric, there is a high probability that a frame transmitted and received with errors (e.g., an erasure) is correctly detected as an erasure. Similarly, relation (4d) indicates that, in using the additional metric(s), there is a higher probability that a frame not transmitted (e.g., a DTX frame) is correctly detected as a DTX frame by the DTX detector. Conversely, using multiple metric indicates that the chances of making a false erasure detection (relation (4b)) or a false DTX detection (relation (4c)) are quite low.

Therefore the method and system of the invention provide greater DTX reliability by using metrics in addition to the channel energy metric or the channel SER metric, so that a condition required to declare a frame as a DTX frame is more restrictive. The invention is applicable to both forward and reverse links, and benefit both the base station and mobile station performance. Additionally, the method and system may apply to a case where a link or channel is a single active set, or where a link is in soft hand-off mode.

The invention being thus described, it will be obvious that the same may be varied in many ways, for example, the logical blocks in FIGS. 1 and 2 may be implemented in hardware and/or software. The hardware/software implementations may include a combination of processor(s) and article(s) of manufacture. The article(s) of manufacture may further include storage media, computer-readable media having code portions thereon that are read by a processor to perform the method, and executable computer program(s). The executable computer program(s) may include instructions to perform the described operations and the method. The computer executable(s) may also be provided as part of externally supplied propagated signals. Such variations are not to be regarded as a departure and scope of the invention, and all such modifications as would be obvious to one skilled in the art are intended to be included within the scope of the following claims.

What is claimed:

1. A method of detecting discontinued transmission (DTX) frames in data frames received over a link or channel, the method comprising the step of:
   determining whether a received data frame is a DTX frame based on a plurality of comparing steps,
      at least a first one of the comparing steps comparing a first unique metric to a first unique threshold and determining that the received data frame is an erasure if the comparison determines that the first unique metric is less than the first unique threshold, wherein an erasure is a transmitted data frame that is received with errors, and
      if the first unique metric is greater than or equal to the first unique threshold, at least a second one of the comparing steps comparing a second unique metric to a second unique threshold and determining that the received data frame is a DTX frame if the second unique metric is greater than or equal to the second unique threshold.

2. The method of claim 1, wherein the unique metric is based on a traffic energy value or a symbol error rate (SER) value measured from the received data frame.

3. The method of claim 1, wherein the unique metric is based on at least one of a pilot frame energy value measured from the received data frame, a traffic energy value of an alternative traffic channel that is known, a priori, not to be in DTX, and a symbol error rate (SER) value of said alternative traffic channel known, a priori, not to be in DTX.

4. An apparatus for detecting discontinued transmission (DTX) frames in data frames received over a link or channel, comprising:
   at least one processor configured to determine whether a received data frame is a DTX frame based on a plurality of comparing steps,
      at least a first one of the comparing steps comparing a first unique metric to a first unique threshold and determining that the received data frame is an erasure if the comparison determines that the first unique metric is less then the first unique threshold, wherein an erasure is a transmitted data frame that is received with errors, and
      if the first unique metric is greater than or equal to the first unique threshold, at least a second one of the comparing steps comparing a second unique metric to a second unique threshold and determining that the received data frame is a DTX frame if the second unique metric is greater than or equal to the second unique threshold.

5. The apparatus of claim 4, wherein the unique metric is based on at least one of a traffic energy value and a symbol error rate (SER) value measured from the received data frame.

6. The apparatus of claim 4, wherein the unique metric is based on at least one of a pilot frame energy value measured from the received data frame, a traffic energy value of an alternative traffic channel that is known, a priori, not to be in DTX, and a symbol error rate (SER) value of said alternative traffic channel known, a priori, not to be in DTX.

7. A method of detecting discontinued transmission (DTX) frames in data frames received over a link or channel, the method comprising:
   determining whether a received data frame is a DTX frame or an erasure based on a plurality of comparing steps, an erasure being a transmitted data frame that is received with errors,
      at least a first one of the comparing steps comparing a first unique metric to a first unique threshold and determining that the received data frame is an erasure if the comparison determines that the first unique metric is less than the first unique threshold, and
      if the first unique metric is greater than or equal to the first unique threshold, at least a second one of the comparing steps comparing a second unique metric to a second unique threshold and determining that the received data frame is a DTX frame if the second unique metric is greater than or equal to the second unique threshold.

8. The method of claim 7, wherein the first unique metric is at least one of a traffic energy value and a symbol error rate (SER) value measured from the received data frame.

9. The method of claim 7, wherein the second unique metric is at least one of a pilot frame energy value measured from the received data frame, a traffic energy value of an alternative traffic channel that is known, a priori, not to be in DTX, and a symbol error rate (SER) value of said alternative traffic channel known, a priori, not to be in DTX.

* * * * *